(12) United States Patent
Tanaka et al.

(10) Patent No.: US 7,639,437 B2
(45) Date of Patent: Dec. 29, 2009

(54) LENS DRIVING SYSTEM

(75) Inventors: Junichi Tanaka, Saitama (JP); Koshi Kuwakino, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/955,930

(22) Filed: Dec. 13, 2007

(65) Prior Publication Data

US 2008/0158661 A1 Jul. 3, 2008

(30) Foreign Application Priority Data

Dec. 27, 2006 (JP) ............................. P2006-352913

(51) Int. Cl.
*G02B 7/02* (2006.01)
*G02B 17/00* (2006.01)
(52) U.S. Cl. .......................... 359/819; 359/822; 396/79
(58) Field of Classification Search ......... 359/694–701, 359/819–824; 396/79, 80; 348/372
See application file for complete search history.

(56) References Cited

U.S. PATENT DOCUMENTS

2005/0281551 A1* 12/2005 Ono et al. ..................... 396/79

2006/0120709 A1* 6/2006 Kobayashi ..................... 396/80
2006/0267645 A1* 11/2006 Gonzalez et al. ............. 327/156
2007/0070235 A1* 3/2007 Maejima et al. ............. 348/335

FOREIGN PATENT DOCUMENTS

JP 2000-111785 A 4/2000
JP 2001-21785 A 1/2001

* cited by examiner

*Primary Examiner*—Mohammed Hasan
(74) *Attorney, Agent, or Firm*—Birch, Stewart, Kolasch & Birch, LLP

(57) ABSTRACT

A lens driving system configured to be mounted on a lens device has: a variable power lens driving section moves a variable power lens group in an optical axis direction; a focus lens driving section moves a focal lens group in the optical axis direction; a receiving section that receives an operation signal for remotely operating the variable power lens driving section and the focus lens driving section; a control section that generates a control signal for controlling the variable power lens driving section and the focus lens driving section based on the operation signal, and a power section that is charged with at least a part of the operation power supplied to a drive section from a camera device and supplies the charged power to the variable power lens driving section, the focus lens driving section, the receiving section, and the control section as operation power.

18 Claims, 5 Drawing Sheets

LENS DRIVING SYSTEM

CROSS-REFERENCE TO RELATED APPLICATIONS

This application is based upon and claims the benefit of priority from the Japanese Patent Application No. 2006-352913 filed on Dec. 27, 2006; the entire contents of which are incorporated herein by reference.

BACKGROUND OF THE INVENTION

1. Technical Field

The invention relates to a lens driving system, and more particularly, to a lens driving system that is mounted on a lens device having a variable power lens moving mechanism for moving a variable power lens group and/or a focus lens moving mechanism for moving a focus lens group and a driving section to which operation power is supplied from a camera device.

2. Description of the Related Art

Recently, in banking branches or retail stores, monitoring cameras constituted by CCDs and the like are often used. In this type of the monitoring cameras, a varifocal lens of which angle of view and focus are manually adjustable is used as an alternative of a fixed focus lens or a zoom lens.

When the fixed focus lens is used, focus adjustment can be made but the angle of view cannot be adjusted. Therefore it is required to prepare a plurality of lens and select a lens that provides a desired photographing condition, from among the plurality of lens. When the zoom lens is used, the angle of view can be adjusted and its focus does not change even if the angle of view is adjusted. Therefore, when the focus is adjusted once during the installation, a desired photographing condition can be easily achieved by adjusting the angle of view only. On the other hand, when the varifocal lens is used, the angle of view can be adjusted. However, the varifocal lens does not have the configuration that the focus does not change even if the angle of view is adjusted. Therefore, it is required to readjust its focus again each time the angle of view is adjusted during the installation. However, since the configuration of the varifocal lens is less complex than that of the zoom lens, the manufacturing cost can be relatively reduced. Thus, the varifocal lens is often used for the purpose of monitoring cameras.

The monitoring cameras are installed on ceils, wall faces, or the like of the stores, the optical axes of the lenses are set in a certain direction, and then, the angles of field and focuses are appropriately adjusted, for completing the installation of the monitoring cameras. Here, generally, the angle of view and the focus of the varifocal lens have been adjusted by adjusting a manual adjustment section provided in a lens main body. However, recently, an electrical adjustment based on a remote operation is demanded for the following reasons.

Generally, the focus of the varifocal lens is adjusted by temporarily connecting a monitor to the camera and checking an image displayed on the monitor. Thus, it is difficult to manually adjust the focus while checking the monitor, particularly, in the case where the camera is installed to a high location. In addition, since a delicate adjustment is required as resolution of the camera increases, there is the case where it is difficult to manually adjust the focus. In addition, when a dome-type monitoring camera is used, a dome is installed after the angle of view and focus are adjusted. However, a light path length may change due to installment of the dome. As a result, the adjusted focus is misaligned. In such a case, it becomes necessary to repeat manual adjustment of the focus and attachment/detachment of the dome in a trial-and-error manner. Accordingly, it may be difficult to install the monitoring camera.

Accordingly, JP 2001-21785 A discloses an electrically driven varifocal lens that enables an operation switch to adjust its angle of view and focus and automatically adjusts a photographing condition by setting predetermined adjustment condition in advance.

A varifocal lens requires that its focus is adjusted each time every time its angle of view is adjusted. However, this adjustment is required only at a time of installation. An expensive system that has a zoom lens only for the purpose of the adjustment is less-needed. Thus, if an electrical adjustment based on a remote operation using an infrared ray, a weak electric wave, or the like is applied to a varifocal lens, an inexpensive system can be built although the efficiency of an adjustment operation is lower than that of the zoom lens.

However, generally, operation power supplied from a camera is supplied for the purpose of driving an iris, an infrared ray cut-off filter, and the like and is not supplied for the purpose of controlling driving the angle of view and focus. Thus, when electrical adjustment based on a remote operation is applied, there is a need for a dedicated camera, instead of a general camera, that enables the angle of view and focus to be driven and controlled driven to be controlled. However, if the dedicated camera is used, versatility of system integration is reduced and the effect of reduction in the manufacturing cost achieved by using the varifocal lens becomes meaningless.

SUMMARY OF THE INVENTION

The invention has been made in view of the above circumstances and provides a novel and improved lens driving system that makes it possible, using operation power supplied from a camera, that an angle of view and/or a focus is adjustable by a remote operation.

According to a first aspect of the invention, a lens driving system is configured to be mounted on a lens device comprising a variable power lens moving mechanism that moves a variable power lens group, a focus lens moving mechanism for moving a focus lens group, and a certain drive section to which operation power is supplied from a camera device. The lens drive system includes a variable power lens driving section, a focus lens driving section, a receiving section, a control section and a power section. The variable power lens driving section is connected to the variable power lens moving mechanism and moves the variable power lens group in an optical axis direction. The focus lens driving section is connected to the focus lens driving mechanism and moves the focus lens group in the optical axis direction. The receiving section receives an operation signal for remotely operating the variable power lens driving section and the focus lens driving section. The control section generates a control signal for controlling the variable power lens driving section and the focus lens driving section, based on the operation signal. The power section is charged with at least a part of the operation power supplied to the certain drive section and supplies the charged power to the variable power lens driving section, the focus lens driving section, the receiving section, and the control section as operation power.

With this configuration, since the variable power lens and the focus lens driving sections are controlled based on the remote operation signal, a less expensive control system is constructed than a control system applied to a zoom lens. Also, since provided is the power section that is charged with the at least part of the operation power supplied to the drive section from a general camera and supplies the charged power to the variable power lens driving section, the focus lens driving sections, the receiving section and the control section as operation power, the general camera can be used for electrical adjustment based on the remote operation instead of a dedicated camera.

According to a second aspect of the invention, a lens driving system is configured to be mounted on a lens device comprising a variable power lens moving mechanism for moving a variable power lens group and a certain drive section to which operation power is supplied from a camera device. The lens drive system includes a variable power lens driving section, a receiving section, a control section and a power section. The variable power lens driving section is connected to the variable power lens moving mechanism and moves the variable power lens group in an optical axis direction. The receiving section receives an operation signal for remotely operating the variable power lens driving section. The control section generates a control signal for controlling the variable power lens driving section based on the operation signal. The power section is charged with at least a part of the operation power supplied to the certain drive section and supplies the charged power to the variable power lens driving section, the receiving section, and the control section as operation power.

With this configuration, since provided is the power section that is charged with the at least part of the operation power supplied to the drive section from a general camera and supplies the charged power to the variable power lens driving section, the receiving section, and the control section as operation power, the general camera can be used for electrical adjustment based on the remote operation instead of a dedicated camera.

According to a third aspect of the invention, a lens driving system is configured to be mounted on a lens device comprising a focus lens moving mechanism for moving a focus lens group and a certain drive section to which operation power is supplied from a camera device. The lens drive system includes a focus lens driving section, a receiving section, a control section and a power section. The focus lens driving section is connected to the focus lens driving mechanism and moves the focus lens group in an optical axis. The receiving section receives an operation signal for remotely operating the focus lens driving section. The control section generates a control signal for controlling the focus lens driving section based on the operation signal. The power section is charged with at least a part of the operation power supplied to the certain drive section and supplies the charged power to the focus lens driving section, the receiving section, and the control section as operation power.

With this configuration, since provided is the power section that is charged with the at least part of the operation power supplied to the drive section from a general camera and supplies the charged power to the focus lens driving section, the receiving section and the control section as operation power, the general camera can be used for electrical adjustment based on the remote operation instead of a dedicated camera.

The lens driving system may be detachably mounted on the lens device. With this configuration, since the lens driving system is attached to the lens device at the time of use and is detached after use, the lens driving system can be repeatedly used for an operation of installing another camera.

The operation power supplied to the lens driving system may be supplied to the power section through the drive section. With this configuration, since operation the power supplied to the drive section from the general camera is supplied to the power section through the drive section, a higher priority is given to the power supply to the drive section than that to the power section.

The certain drive section may be an iris driving section or an infrared ray cut-off filter driving section. With this configuration, since the operation power supplied to the iris driving section or the infrared ray cut-off filter from the general camera is supplied to the power section, the general camera can be used for electrical adjustment based on the remote operation instead of a dedicated camera.

According to any of the above configurations, there is provided a lens driving system that makes it possible, using operation power supplied from a camera, that an angle of view and/or a focus is adjustable by a remote operation.

DETAILED DESCRIPTION OF EMBODIMENT(S) OF THE INVENTION

Figure 1:
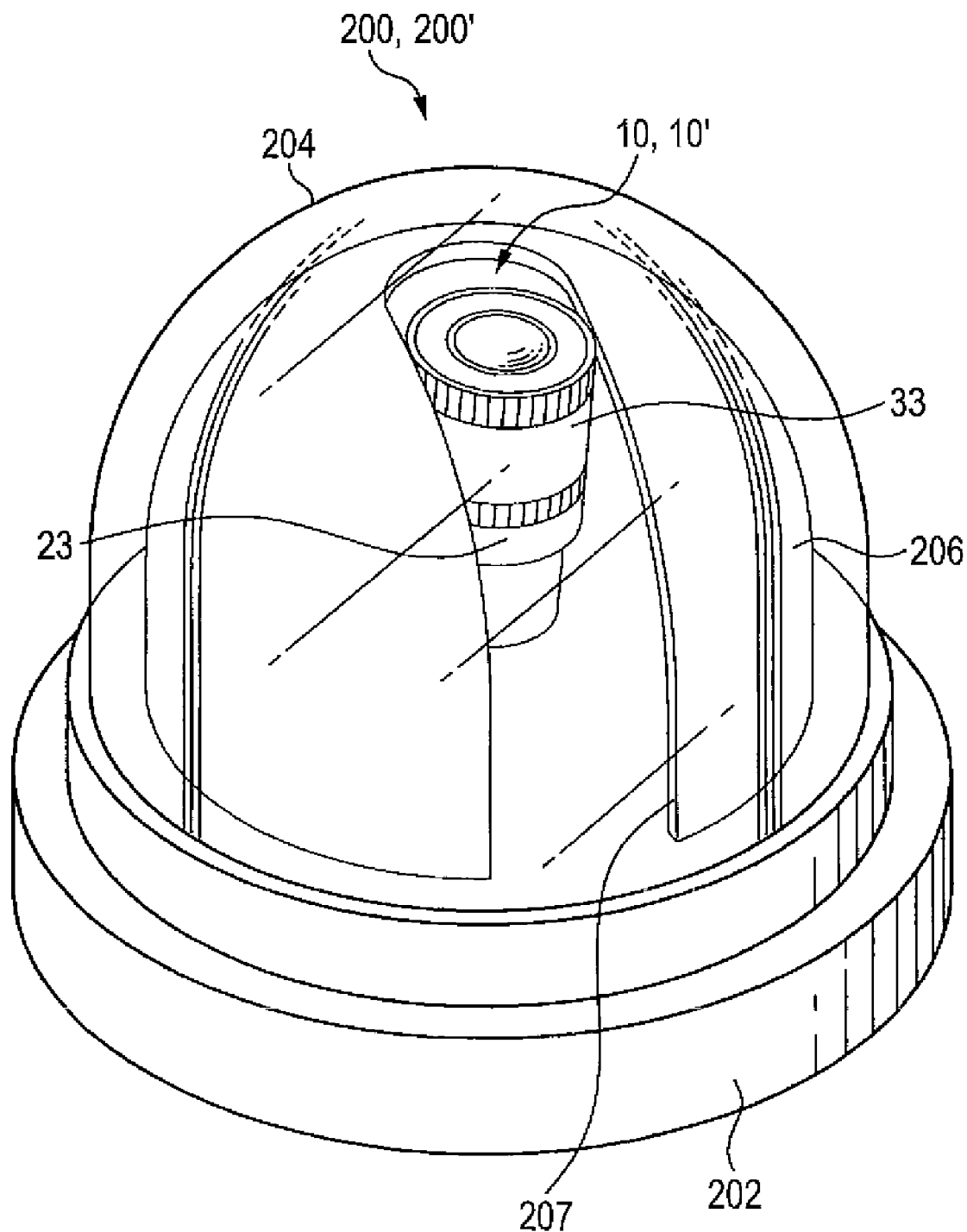
FIG. 1 is a perspective view of a monitoring camera to which a varifocal lens according to embodiments of the invention is applied, as an example.

Hereinafter, exemplary embodiments of the invention will be described in detail with reference to the accompanying drawings. In the specification and the accompanying drawings, the same reference numeral is assigned to components having a substantially same function and a same substantially configuration, and a duplicate description thereof will be omitted.

FIG. 1 is a perspective view of a monitoring camera to which a varifocal lens according to embodiments of the invention is applied, as an example. As shown in FIG. 1, the monitoring camera 200, 200' has dome-like-shape appearance. The monitoring camera 200, 200' has a base 202, a dome 204, a camera main body 70, 70' mounted on the base 202 inside the dome 204, and a lens 10, 10' mounted on the camera main body 70, 70'. The varifocal lens 10, 10' can be mounted so that an angle between the varifocal lens 10, 10' and the base 202 is changeable (tilt rotation) and/or the varifocal lens 10, 10' is rotatable with respect to the base 202 around a center line as a rotation axis (pan rotation).

As shown in FIG. 1, inside the dome 204, the lens 10, 10' can be covered with a cover 206. The cover 206 is formed with an opening 207 that corresponds to the whole range of the tilt rotation of the lens 10, 10'. The cover 206 can be mounted so as to be rotatable with respect to the base 202, together with the lens 10, 10', about the center line as a rotation axis. The dome 204 including the lens 10, 10' is provided in a predetermined position so as to cover at least a photographing range of the lens 10, 10', a zoom ring 23 and a focus ring 33 for the purpose of protecting the lens 10, 10' and hiding a photographing direction.

On the outer circumference of the varifocal lens 10, 10', the zoom ring 23 used for adjusting an angle of view and the focus ring 33 used for adjusting focus are provided. The zoom and focus rings 23, 33 are disposed on a rear side (photographer side) of the varifocal lens 10, 10' and a front side (object side) thereof in correspondence with positions of a zoom lens (group) 26 (corresponding to a variable power lens group) and a focus lens (group) 36 (corresponding to a focus lens group) provided in the varifocal lens 10, 10'.

Figure 2:
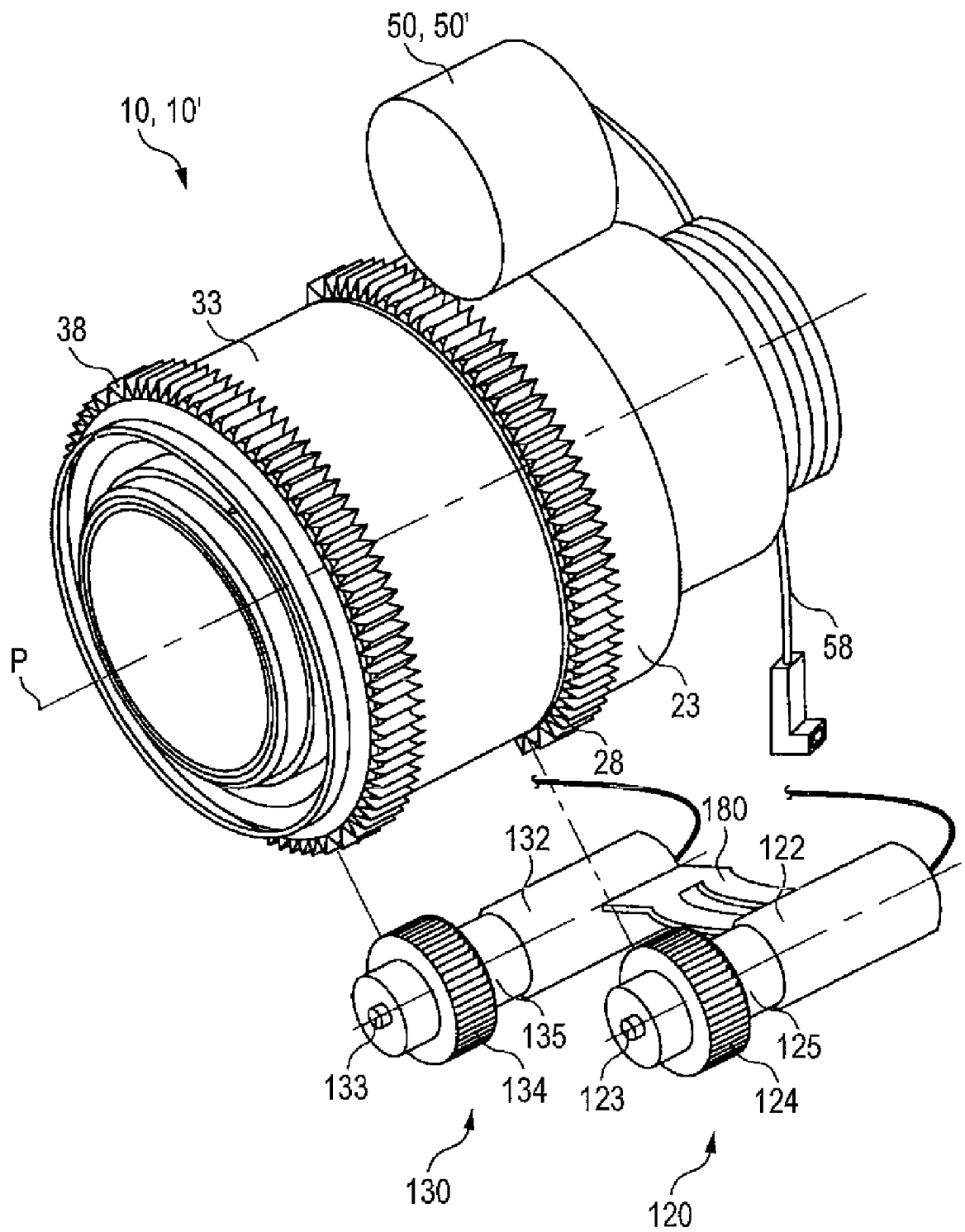
FIG. 2 is an exploded perspective view showing a part of a lens driving system according to the embodiments of the invention and a varifocal lens on which the lens driving system is mounted.
Figure 3:
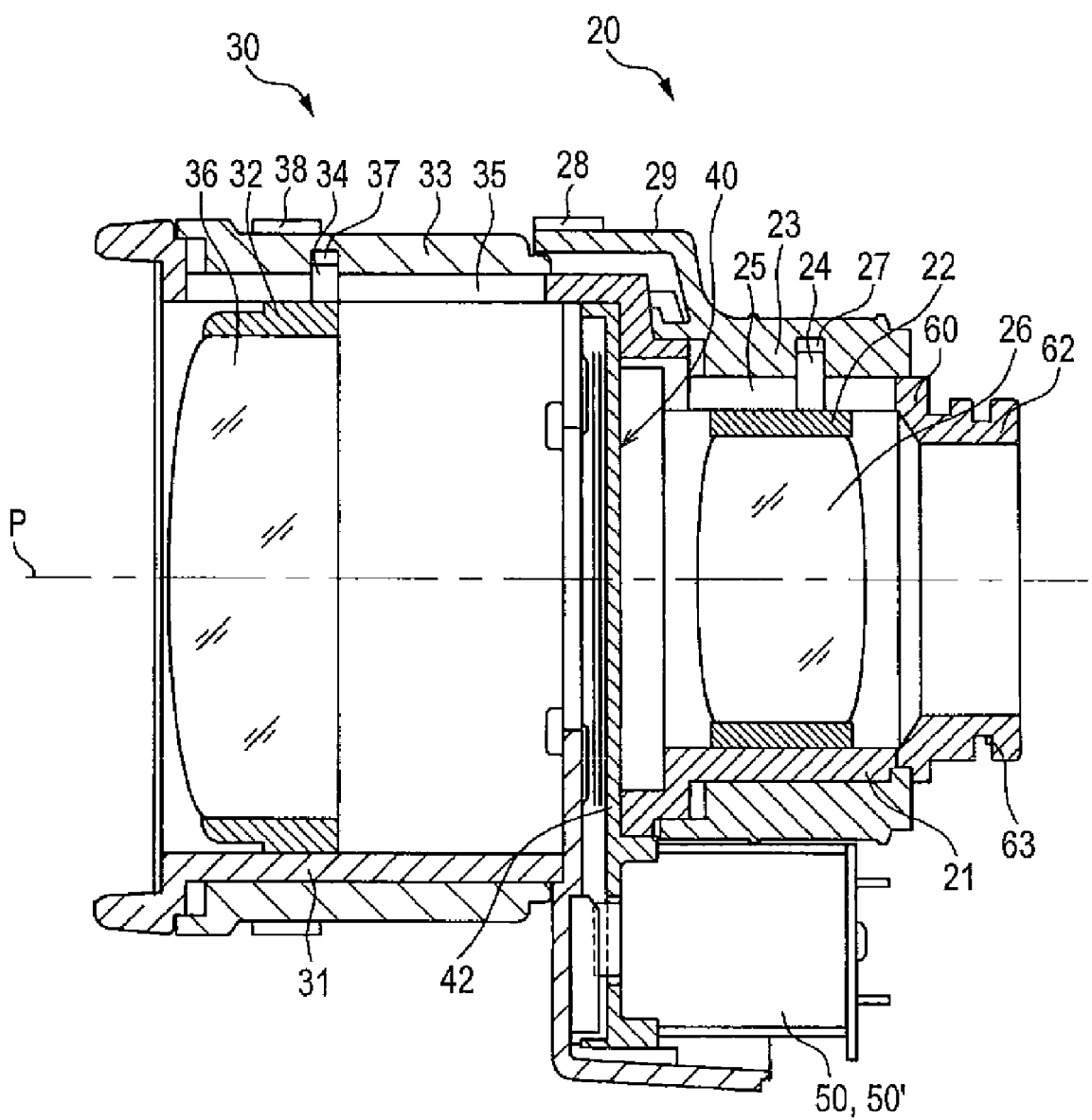
FIG. 3 is a section view of the varifocal lens shown in FIG. 2 taken along an optical axis thereof.

FIG. 2 is an exploded perspective view showing a part of a lens driving system according to the embodiments of the invention and the varifocal lens on which the lens driving system is mounted. FIG. 3 is a section view of the varifocal lens shown in FIG. 2 taken along the optical axis thereof. The lens driving system 100, 100' according to the embodiment has a zoom driving section 120 (corresponding to a variable power lens driving section), a focus driving section 130 (corresponding to a focus lens driving section), a receiving section 40, a power section 150, 150', a control section 160, and the like (see FIGS. 4 and 5). The lens driving system 100, 100' is mounted on the varifocal lens 10, 10'.

First, the varifocal lens 10, 10' will now be described. The varifocal lens 10, 10' has a zoom moving mechanism 20 (corresponding to a variable power lens moving mechanism), a focusing moving mechanism 30 (corresponding to a focus lens moving mechanism), an iris adjustment mechanism 40 disposed between both the moving mechanisms, and the like. As shown in FIG. 3, the varifocal lens 10, 10' has fixed barrels 21 and 31. Inside the fixed barrels 21 and 31, lens frames 22 and 32 and the like are disposed. On outer peripherals of the fixed barrels 21 and 31, the zoom and focus rings 23 and 33 are disposed.

The lens frame 32 is disposed on a front side (object side) inside the fixed barrel 31 and holds the focus lens (group) 36. To the lens frame 32, an engagement pin 34 protruding from a periphery surface thereof is attached. On the other hand, in the fixed barrel 31, a straight groove 35 is formed in a direction of an optical axis P. The engagement pin 34 is engaged with the straight groove 35. Thereby, the lens frame 32 and the focus ring 33 are configured to be guided by the straight groove 35 to move straight in the direction of the light axis P.

The lens frame 22 is disposed on a rear side (photographer side) of the lens frame 32 inside the fixed barrel 21 and holds the zoom lens (group) 26. To the lens frame 22, an engagement pin 24 protruding from a periphery thereof is attached. In the fixed barrel 21, a straight groove 25 is formed in the direction of the optical axis P. The engagement pin 24 is engaged with the straight groove 25. Thereby, the lens frame 22 and the zoom ring 23 are configured to be guided by the straight groove 25 to move straight in the direction of the optical axis P. In FIG. 3, the zoom lens (group) 26 and the focus lens (group) 36 are constituted by signal lenses, respectively. However, the invention is not limited thereto.

The focus ring 33 is disposed on the outer periphery of the fixed barrel 31 so as to be rotatable, in a portion in which the lens frame 32 is disposed. On the inner periphery of the focus ring 33, a cam groove 37 is formed in the shape of a spiral with respect to the optical axis P. The engagement pin 34 attached to the lens frame 31 is engaged with the cam groove 37 of the focus ring 33. Thereby, when the focus ring 33 is rotated, a position of an intersection between the cam groove 37 of the focus ring 33 and the straight groove 35 of the fixed barrel 31 is moved in the optical direction P while the engagement pin 34, the lens frame 32 and the focus lens (group) 36 are moved in the optical direction P in accordance with the position of the intersection. As described above, by rotating the focus ring 33, a setting position of the focus lens (group) 36 is adjusted, to thereby adjust the focus.

The zoom ring 23 is disposed on the rear side of the focus ring 22 and is disposed to be rotatable on the outer periphery of the fixed barrel 21. In the zoom ring 23, an extension portion 29 is provided on the focus ring 33 side. In the extension portion 29, the inner diameter of the zoom ring 23 increases so as to cover the outer periphery of the focus ring 33. In the inner periphery of the zoom ring 23, a cam groove 27 is formed in the shape of a spiral with respect to the optical axis P. The engagement pin 24 attached to the lens frame 21 is engaged with the cam groove 27 of the zoom ring 23.

Accordingly, by rotating the zoom ring 23, a position of an intersection between the cam groove 27 of the zoom ring 23 and the straight groove 25 of the fixed barrel 21 is moved in the direction of the optical axis P while the engagement pin 24, the lens frame 21 and the zoom lens (group) 26 are moved in the direction of the optical axis P in accordance with the position of the intersection. As described above, by rotating the zoom ring 23, a setting position of the zoom lens (group) 26 is adjusted, to thereby adjust the angle of view.

In the above-described configuration, the straight grooves 25 and 35 are provided in the fixed barrels 21 and 31 and the cam grooves 27 and 37 having the spiral shape are provided in the zoom and focus rings 23 and 33. However, the cam grooves 27 and 37 having the spiral shape may be provided in the fixed barrels 21 and 31 and the cam grooves 27 and 37 having the straight-line shape may be provided in the zoom ring 23 or the focus ring 33. Furthermore, the cam groove 27 and 37 having the spiral shape may be provided in both of the fixed barrels 21, 31 and the zoom or focus ring 23, 33.

In the front end of the focus ring 33, a connection portion such as a gear portion 38 is provided on the outer periphery thereof. When the gear portion 38 is rotated, the focus ring 33 is rotated. Also, in the front end of the zoom ring 23, a connection portion such as a gear portion 28 is provided on the outer periphery thereof. When the gear portion 28 is rotated, the zoom ring 23 rotates.

The iris adjustment mechanism 40 is interposed between the zoom moving mechanism 20 and the focusing moving mechanism 30. The iris adjustment mechanism 40 has an iris frame 42 having an internal opening/closing portion (not shown) for adjusting an aperture diaphragm, a mechanism for driving the iris frame 42, and the like. In the iris driving section 50, 50', in order to make brightness of an image signal, which is output from the lens 10, 10' to the camera main body 70, 70', be appropriate, the iris frame 42 is driven in accordance with a drive voltage input from the camera main body 70, 70'.

Hereinafter, the iris driving section 50, 50' will be described with reference to FIGS. 4 and 5. The iris driving section 50, 50' is connected to a connector terminal 12 on the lens 10, 10' side and is connected to the camera main body 70, 70' through an iris control connector 58 and a connector terminal 72 disposed on the camera main body 70, 70' side. Here, the iris control connector 58 includes a power line and a grounding line. The operation voltage (driving voltage) of the iris driving section 50, 50' is supplied from the camera main body 70, 70' through the power line. The iris operation power supplied through the iris control connector 58 is normally in the range of 0 to 4 volts and 20 to 25 mA.

The iris driving section 50, 50' has an iris driving motor 52 and a motor driving section 54 for driving the iris driving motor 52. The motor driving section 54 is configured to be connected to the power line and the ground line of the iris control connector 58 through the connector terminal 12 on the lens 10, 10' side so that the operation power (drive voltage) is supplied to the motor driving section 54 from the power line. A predetermined drive voltage is supplied to the motor driving section 54 so as to maintain its status, so long as the iris frame 42 is not completely closed.

On the rear side of the fixed barrel 21, a mounting frame 60 for replaceably mounting the lens 10, 10' on the camera main body 70, 70' is provided. The mounting frame 60 is formed in the shape of an approximate cylinder. In the rear end of the mounting frame 60, a mounting portion 62 in the annular shape is provided. On the outer periphery of the mounting portion 62, a screw portion 63 is formed. The lens 10, 10' can be mounted on the camera main body 70, 70' or the like by engaging the screw portion 63 of the mounting portion 62 with a screw portion formed on a mounting portion (not shown) on the camera main body 70, 70' side.

Figure 4:
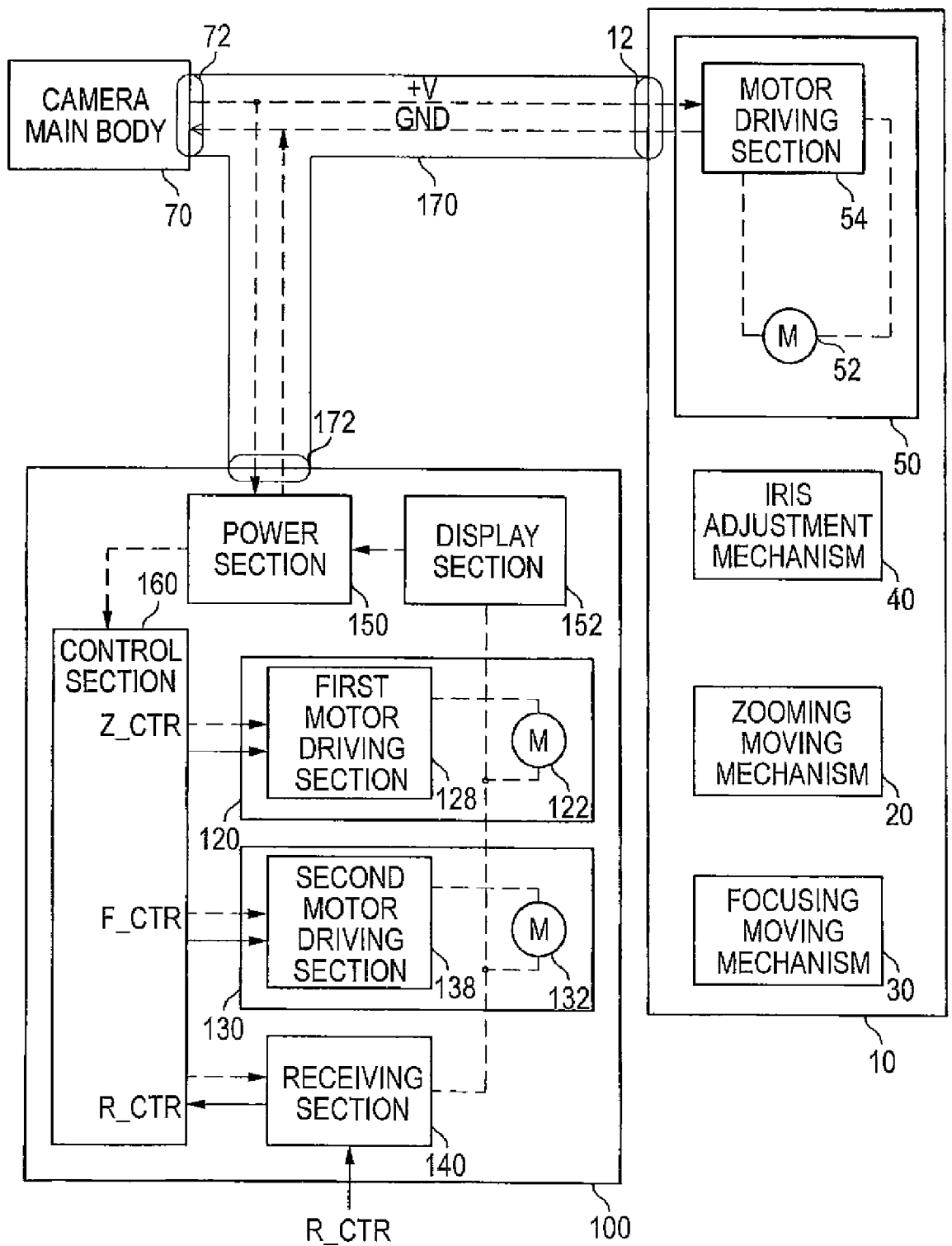
FIG. 4 is a schematic block diagram showing the configuration of a lens driving system according to a first embodiment of the invention.

FIG. 4 is a schematic block diagram showing the configuration of the lens driving system according to a first embodiment of the invention.

The lens driving system 100 is connected between the lens 10 and the camera main body 70, for example, through a dedicated three-way connector 170 or the like. The lens driving system 100 has the zoom and focus driving sections 120 and 130, the receiving section 140, the power section 150, the control section 160, and the like. Like the iris control connector 58, the dedicated connector 170 includes a power line (+V) and a ground line (GND).

First, the zoom and focus driving sections 120 and 130 provided in the lens driving system 100 according to this embodiment will now be described. Since the zoom and focus driving sections 120 and 130 have similar configurations, hereinafter, particularly the zoom driving section 120 will be described.

As shown in FIG. 2, the zoom driving section 120 has a motor 122 for supplying a drive force to the zoom moving mechanism 20, a drive gear 124 for transferring the drive force of the motor 122 to the zoom ring 23, and the like. In FIG. 4, the driving sections 120 and 130 are schematically shown as the motors 122 and 132 and motor driving sections 128 and 138 which constitute the respective driving sections. Here, for example, a DC motor is used as the motor 122. However, the invention is not limited thereto. The zoom driving section 120 is detachably attached to an attachment portion (not shown) of the lens 10 through an attachment member 180 so that the drive gear 124 is engaged with the connection portion such as the gear portion 28 which is provided on the outer periphery of the zoom ring 23. The drive gear 124 has a gear shaft 125 fixed to a shaft 123 of the motor 122. The drive gear 124 is rotated by transferring torque of the shaft 123 of the motor to the drive gear 124 through the shaft 125.

The zoom and focus driving sections 120 and 130 are controlled by the control section 160 which will be described later. As shown in FIG. 2, the varifocal lens 10 is connected to the zoom and focus driving sections 120 and 130 so that the gear portions 28 and 38 of the zoom and focus rings 23 and 33 are engaged with the drive gears 124 and 134 so as to enable the zoom and focus rings 23 and 33 to rotate. Accordingly, when a drive voltage is supplied to the motor 122 of the zoom driving section 120 through the control section 160, the motor 122 is operated so as to transfer a drive force to the zoom ring 23 through the drive gear 124 and the gear portion 28, and the zoom ring 23 is rotated. Thereby, the torque of the zoom ring 23 is converted into straight movement of the zoom lens (group) 26 through the zoom moving mechanism 20. As a result, the zoom can be adjusted by electrical driving.

Next, the receiving section 140 provided in the lens driving system 100 will now be described. The receiving section 140 receives a remote control signal (R_CTL) via, for example, an infrared ray or a weak electric wave, transmitted from a remote control device. For example, in the case where an infrared ray is used as the remote operation signal, the receiving section 140 includes a light receiving element for converting received infrared ray into an electrical signal, an output circuit for outputting the converted electrical signal to the control section 160, and the like. In the case of a dome-shaped monitoring camera, a required measure such as selecting an appropriate material or configuration of the dome 204 is taken so that the dome 204 does not block input of the operation signal to the reception section 140.

Here, as the light receiving element, a thermal type element that uses thermal reaction of the infrared ray such as a thermal expansion-type one, a pyroelectric type one, a thermocouple type one, or a resistance type one or a quantum type element in which the infrared ray serves as an energy block (a light photon or a photon) determined by its wave length is used, such as a photo electric tube-type one, a photo conduction type one, or a conjunction type one. The light receiving element absorbs the infrared energy as heat and uses a phenomenon in which a change in surface charges, a thermo-electromotive force, or electrical resistance due to temperature increase caused by the absorption of the infrared energy appears.

Next, the power section 150 provided in the lens driving system 100 will now be described. The power section 150 is constituted by a rechargeable battery and is connected to the control section 160 of the lens driving system 100 as well as the motor driving section 54 of the lens 10 through the power line and ground line of the dedicated connector 170. The power section 150 is charged with at least a part of operation power supplied from the camera main body 70 to the iris driving section 50 and the like and supplies the charged power to the zoom and focus driving sections 120 and 130 and the receiving section 140 through the control section 160 as an operation power, if necessary.

Here, while an output level of about 3 volts is required as the operation power for the zoom and focus driving sections 120 and 130, the control section 160, and the like, an output level of 0 to 4 volts is required as the iris operation power. However, there is the case where drive control of the zoom and focus is required simultaneously with the iris being driven for adjustment of the angle of view and the focus. In such a case, sufficient operation power cannot be supplied for driving the iris and the zoom and focus. Also, when a long time charging operation is required before the operation power is supplied, a control operation for driving the zoom and focus cannot be performed until charged power of the power section 150 reaches a predetermined reference level that is required for the operation of the lens driving system 100. Thus, a setting operation itself is delayed.

Accordingly, the power section 150 is constituted by the rechargeable battery such as a secondary fuel cell or a super capacitor which has a high efficiency of charging. The super capacitor is a device for storing and supplying energy in which accumulation of positive and negative charges in a boundary between solid and liquid called electrical dual layers is used. The super capacitor has characteristics of repetitive charging and discharging, high charging and discharging speed, and the like. By configuring the power section 150 as the rechargeable battery, surplus power that is not used for driving the iris can be accumulated for being used in a control operation of driving the zoom and focus.

Next, the control section 160 provided in the lens driving system 100 will now be described. The control section 160 includes a control device such as a controller. The control section 160 is connected to the zoom and focus driving sections 120 and 130 and the receiving section 140 as well as the power section 150. In accordance with necessity, the control section 160 supplies the operation power supplied from the power section 150, to the zoom and focus driving sections 120 and 130 and the receiving section 140 as operation power. The control section 160 generates control signals (Z_CTL and F_CTL) for controlling the first and second motor driving sections 128 and 138 in accordance with the remote operation signal (R_CTL) input from the receiving section 140 and outputs the control signals to the motor driving sections 128 and 138. The first and second motor driving sections 128 and 138 determine rotation directions and speeds of the motors 122 and 132 in accordance with the control signals input from the control section 160 and generate driving voltages for rotating the motors 122 and 132.

FIG. 4 shows the case where the operation power supplied from the power section 150 is supplied to the driving sections 120 and 130 and the like through the control section 160. However, the operation power may be directly supplied to the driving sections 120 and 130 and the like not through the control section 160.

Hereinafter, a installation procedure of the monitoring camera 200 having the lens driving system 100 according to this embodiment will be described. The monitoring camera 200 is installed on a ceil or a wall of a store in a state where the lens driving system 100 is mounted on the lens 10, and the optical axis P of the lens 10 is set in a predetermined direction. When power is supplied to the camera main body 70 in a state where the power section 150 of the lens driving system 100 is connected to the connector terminal 12 on the lens 10 and the connector terminal 72 on the camera main body 70 side through the dedicated connector 170, it is started to supply the operation power to the iris driving section 50 and the power section 150.

The zoom and focus driving sections 120 and 130 (drive gears 124 and 134) of the lens driving system 100 are connected to the connection portions (gear portions 28 and 38) of the zooming and focusing moving mechanisms 20 and 30 on the lens 10 side. When a dome-type monitoring camera is employed, the dome 204 is mounted on the camera main body 70 side at this moment in consideration of a change in the light path length due to mounting of the dome.

A part of the operation power supplied from the camera main body 70 that is used for driving the iris is supplied to the iris driving section 50. The other part of the operation power that is not used for driving the iris (surplus output) is charged in the power section 150.

In the lens driving system 100, when the charging of the power section 150 reaches the predetermined reference level, the operation power is supplied to the zoom and focus driving sections 120 and 130, the receiving section 140, and the control section 160. Thereby, a lens driving operation of the lens driving system 100 is started. In other words, the operation signal (R_CTL) transmitted from the remote control device is received by the receiving section 140, the control signals (Z_CTL and F_CTL) for controlling the motor driving sections 128 and 138 are generated in the control section 160 in accordance with the operation signal (R_CTL), and the control signals are output to the respective motor driving sections 128 and 138. In the first and second motor driving sections 128 and 138, driving voltages for driving the motors 122 and 132 are generated in accordance with the control signals, and the generated driving voltages are output to the motors 122 and 132. Accordingly, in the motors 122 and 132, torques of the gear shafts 124 and 134 and the gear portions 28 and 38 are converted into straight movement of the zoom and focus lenses (groups) 26 and 36 in accordance with rotation of the motor shafts 123 and 133. Thereby, the angle of view and the focus can be adjusted by the electrical driving.

As described above, according to this embodiment, the zoom and focus driving sections 120 and 130 are controlled based on the remote operation signals. Therefore, a control system can be provided that is less expensive than a control system that is applied to a zoom lens. Also, since the power section 150 that is charged with at least a part of the operation power, in a general camera, supplied to the iris driving section 50 and supplies the charged operation power to the zoom and focus driving sections 120 and 130, the receiving section 140, and the control section 160 as operation power is provided, a general camera instead of a dedicated camera can be used for electrical driving control based on a remote operation.

In the lens driving system 100, a display section 152 for displaying a charged state of the power section 150, for example, which is configured by an LED or the like may be provided. The display section 152 may be configured by a plurality of LEDs for displaying the charged state in a stepwise manner or an LED for displaying the charged state by a change in a blinking time. Since the charged state of the power section 150 can be acquired by using the display section 152, an operator of the remote control device can check availability of the remote operation.

The lens driving system 100 may be detachably mounted on the lens 10. In such a case, when installation is completed, the dedicated connector 170 is detached from the connector terminal 12 on the lens 10 side and the connector terminal 72 on the camera main body 70 side and the lens driving system 100 is detached from the lens 10. Thereby, the lens 10 and the camera main body 70 are connected together through the iris control connector 58 instead of the dedicated connector 170. When a dome-type monitoring camera is used, the dome 204 is detached before the dedicated connector 170 is detached, and the dome 204 is mounted again after the dedicated connector is replaced with the iris control connector 58.

Accordingly, it becomes impossible to change the angle of view and the focus which have been adjusted, by using the remote operation signal. The operation power from the camera main body 70 is supplied only to the iris driving section 50 and the like. Also, since the lens driving system 100 is detachably mounted on the lens 10, the lens driving system 100 can be used repeatedly for an operation for installing another camera.

When the angle of view and the focus are readjusted after the completion of the installation, the power section 150 is connected to the connector terminal 12 on the lens 10 side and the connector terminal 72 on the camera main body 70 side through the dedicated connector 170 in a state where the lens driving system 100 is mounted on the lens 10, and the same installation procedure as that executed at the time of installation is repeated. When a dome-type monitoring camera is used, the dome 204 is detached for mounting the lens driving system 100 before the lens driving system 100 is mounted.

Figure 5:
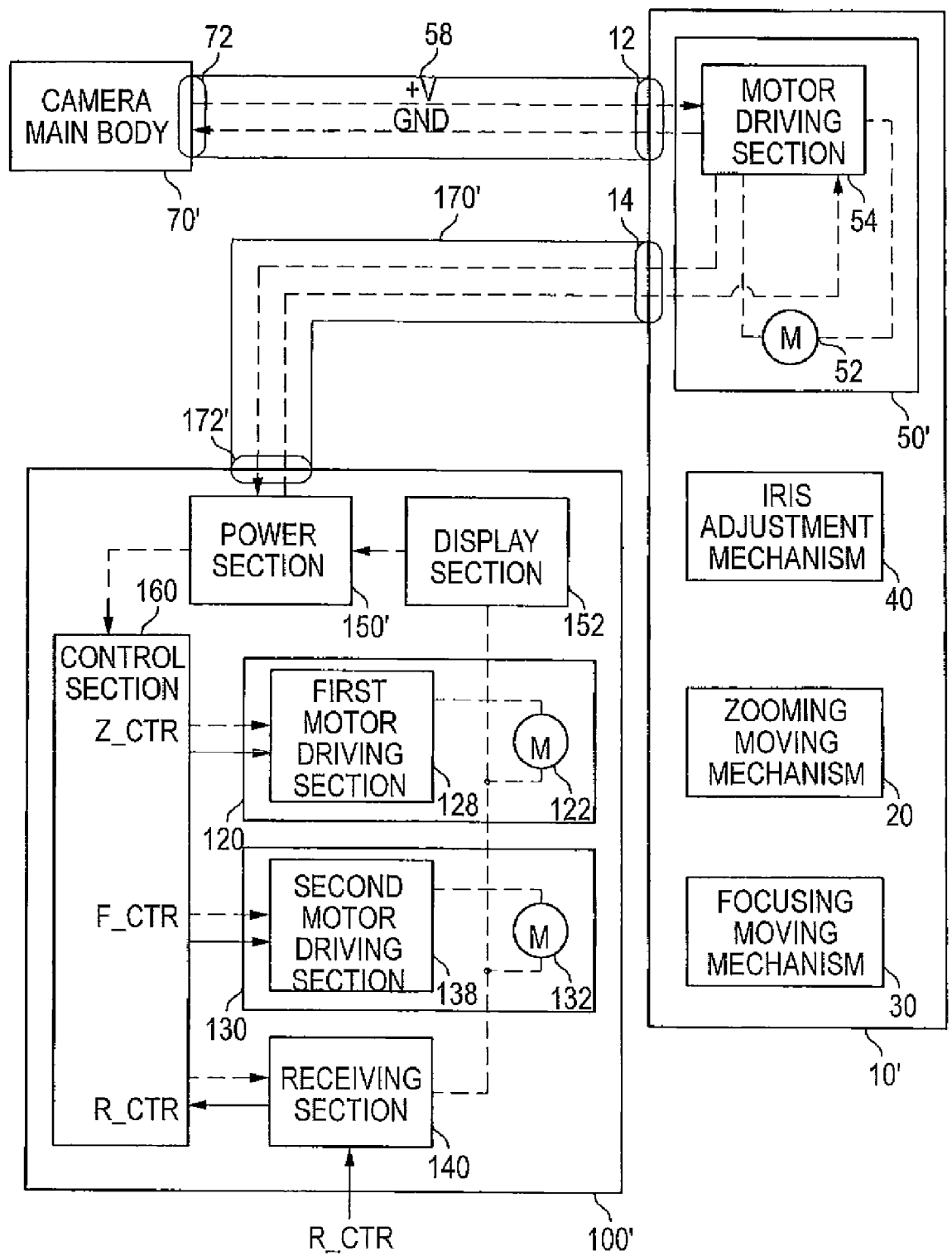
FIG. 5 is a schematic block diagram showing the configuration of a lens driving system according to a second embodiment of the invention.

FIG. 5 is a schematic block diagram showing the configuration of a lens driving system according to a second embodiment of the invention. In descriptions of the second embodiment, descriptions on components that are similar to those in the first embodiment will be omitted omitted.

The lens driving system 100' is electrically connected to the lens 10' through a dedicated connector 170'. The lens driving system 100' has the zoom and focus driving sections 120 and 130, the receiving section 140, a power section 150', the control section 160, and the like. The dedicated connector 170' includes a power line and a ground line.

The power section 150' provided in the lens driving system 100' according to this embodiment will now be described.

The power section 150' is constituted by a rechargeable battery and is connected to the control section 160 of the lens driving system 100' as well as the iris driving section 50' of the lens 10' through the power line and ground line of the dedicated connector 170'. The iris driving section 50' of the lens 10' is connected to the camera main body 70' through the iris control connector 58. The power section 150' is charged with at least a part of operation power supplied to the iris driving section 50' and the like from the camera main body 70' and supplies the charged power to the zoom and focus driving sections 120 and 130 and the receiving section 140 through the control section 160 as an operation power, if necessary.

Hereinafter, an installation procedure of the monitoring camera 200' having the lens driving system 100' according to this embodiment will be described. The monitoring camera 200' is installed on a ceil or a wall of a store in a state where the lens driving system 100' is mounted on the lens 10', and the optical axis P of the lens 10' is set in a predetermined direction. When power is supplied to the camera main body 70' in a state where the power section 150' of the lens driving system 100' is connected to a connector terminal 14 on the lens 10' side through the dedicated connector 170', it is started to supply the operation power to the iris driving section 50' and to the power section 150' through the iris driving section 50'.

The zoom and focus driving sections 120 and 130 (drive gears 124 and 134) of the lens driving system 100' are connected to the connection portions (gear portions 28 and 38) of the zooming and focusing moving mechanisms 120 and 130 on the lens 10' side. When a dome-type monitoring camera is used, the dome 204 is mounted on the camera main body side 70' at this moment in consideration of a change in the light path length due to the mounting of the dome.

While the part of the operation power supplied from the camera main body 70' that is used for driving the iris is supplied to the iris driving section 50', the other part of the operation power that is not used for driving the iris (surplus output) is charged in the power section 150'. Here, in this system 100', a part of the operation power supplied to the lens 10' from the camera main body 70' is supplied to the power section 150', instead of being bypassed so as to be supplied to the power section 150' as shown in FIG. 4. Therefore, after the operation power is supplied to the lens 10', higher priority is given to the power supply to the lens 10'.

As described above, according to this embodiment, since the operation power supplied to the iris driving section 50' by a general camera is supplied to the power section 150' through the iris driving section 50', higher priority is given to the power supply of power to the iris driving section 50' than the power supply to the power section 150'.

The lens driving system may be detachably mounted on the lens device. In such a case, when installation is completed, the dedicated connector 170' is detached from the connector terminal 14 on the lens 10' side and the lens driving system 100' is detached from the lens 10'. Therefore, the lens 10' is connected only to the camera main body 70' through the iris control connector 58. When a dome-type monitoring camera is used, the dome 204 is detached before the dedicated connector 170' is detached, and the dome 204 is mounted again after the dedicated connector 170' is detached.

Accordingly, it becomes impossible to change the angle of view and the focus, which have been adjusted, by using the remote operation signal. The operation power from the camera main body 70' is supplied only to the iris driving section 50' and the like. Also, since the lens driving system 100' is detachably mounted on the lens 10', the lens driving system 100' can be used repeatedly for an operation for installing another camera.

Here, when the angle of view and the focus are readjusted after the completion of the installation, the power section 150' is connected to the connector terminals 14 on the lens 10' side through the dedicated connector 170' in a state where the lens driving system 100' is mounted on the lens 10', and the same installation procedure as that performed at the time of installation is repeated. When a dome-type monitoring camera is used, the dome 204 is detached for mounting the lens driving system 100' before the lens driving system 100'.

As described above, the exemplary embodiments of the invention have been described with reference to the accompanying drawings. However, the invention is not limited thereto. It is apparent that one skilled in the art would achieve various changes or modifications within the scope of claims. Those changes or modifications should be construed as belonging to the technical scope of the invention.

For example, in the above-described embodiments, described is the case where the lens 10, 10' has the zooming and focusing moving mechanisms 20 and 30 and the corresponding lens driving system 100, 100' has the zoom and focus driving sections 120 and 130. However, an application target of the invention is not limited thereto. The invention may be applied to the case where the lens 10, 10' has one of the zooming and focusing moving mechanisms 20 and 30 and the corresponding lens driving system 100, 100' has one of the zoom and focus driving sections 120 and 130.

Also, in the above descriptions, described as examples are the embodiments in which the lens 10, 10' is a varifocal lens. However, an application target of the invention is not limited thereto. In other words, the invention may be similarly applied to the case where the lens 10, 10', for example, is a fixed focus lens having a fixed angle of view and requiring only focus adjustment or a zoom lens requiring adjustment of the angle of view and the focus.

Also, in the above descriptions, described is the lens driving system 100, 100' having the zoom and focus driving sections 120 and 130, the receiving section 140, the power section 150, 150', the control section 160, and the like. However, an application target of the invention is not limited thereto. For example, the invention may be similarly applied to the case where a part of the above-described components such as the receiving section 140 and the control section 160 is disposed on the lens 10, 10' side or the camera main body 70, 70' side, instead of being disposed in the lens driving system 100, 100'.

Also, in the above descriptions, described are the embodiments in which a part of operation power supplied to the iris driving section 50, 50' is supplied to the lens driving system 100, 100'. However, an application target of the invention is not limited thereto. In other words, the invention may be similarly applied to the case where, for example, a part of the operation power supplied to an infrared ray cut-off filter driving section, instead of the iris driving section 50, 50', is supplied to the lens driving system 100, 100'.

Also, in the above descriptions, described as examples are the embodiments in which the lens driving system 100, 100' is applied to the dome-type monitoring camera. However, an application target of the invention is not limited thereto. In other words, the invention may be similarly applied to a monitoring camera of any type other than the dome-type or a camera device other than the monitoring camera.

Also, in the above descriptions, described as examples are the embodiments in which driving forces of the zoom and focus lens driving sections 120 and 130 are transferred to the zooming and focusing moving mechanisms 20 and 30 through the gear mechanisms. However, an application target of the invention is not limited thereto. In other words, the invention may be similarly applied to the case where, for example, belt mechanisms or the like instead of the gear mechanisms are used.

What is claimed is:

1. A lens driving system configured to be mounted on a lens device comprising a variable power lens moving mechanism that moves a variable power lens group, a focus lens moving mechanism for moving a focus lens group, and a certain drive section to which operation power is supplied from a camera device, the lens drive system comprising:
    a variable power lens driving section that is connected to the variable power lens moving mechanism and moves the variable power lens group in an optical axis direction;
    a focus lens driving section that is connected to the focus lens driving mechanism and moves the focus lens group in the optical axis direction;
    a receiving section that receives an operation signal for remotely operating the variable power lens driving section and the focus lens driving section;
    a control section that generates a control signal for controlling the variable power lens driving section and the focus lens driving section, based on the operation signal; and
    a power section that is charged with at least a part of the operation power supplied to the certain drive section and supplies the charged power to the variable power lens driving section, the focus lens driving section, the receiving section, and the control section as operation power,
    wherein the variable power lens group and the focus lens group together form a varifocal lens.

2. The lens driving system according to claim 1, wherein the lens driving system is detachably mounted on the lens device.

3. The lens driving system according to claim 1, wherein the operation power supplied to the lens driving system is supplied to the power section through the certain drive section.

4. The lens driving system according to claim 1, wherein the certain drive section is an iris driving section or an infrared ray cut-off filter driving section.

5. The lens driving system according to claim 1, wherein the power section that is charged with at least a part of the operation power supplied to the certain drive section includes a rechargeable battery.

6. The lens driving system according to claim 1, wherein the power section that is charged with at least a part of the operation power supplied to the certain drive section includes a super capacitor.

7. A lens driving system configured to be mounted on a lens device comprising a variable power lens moving mechanism for moving a variable power lens group and a certain drive section to which operation power is supplied from a camera device, the lens drive system comprising:
    a variable power lens driving section that is connected to the variable power lens moving mechanism and moves the variable power lens group in an optical axis direction;
    a receiving section that receives an operation signal for remotely operating the variable power lens driving section;
    a control section that generates a control signal for controlling the variable power lens driving section based on the operation signal; and
    a power section that is charged with at least a part of the operation power supplied to the certain drive section and supplies the charged power to the variable power lens driving section, the receiving section, and the control section as operation power.

8. The lens driving system according to claim 7, wherein the lens driving system is detachably mounted on the lens device.

9. The lens driving system according to claim 7, wherein the operation power supplied to the lens driving system is supplied to the power section through the certain drive section.

10. The lens driving system according to claim 7, wherein the certain drive section is an iris driving section or an infrared ray cut-off filter driving section.

11. The lens driving system according to claim 7, wherein the power section that is charged with at least a part of the operation power supplied to the certain drive section includes a rechargeable battery.

12. The lens driving system according to claim 7, wherein the power section that is charged with at least a part of the operation power supplied to the certain drive section includes a super capacitor.

13. A lens driving system configured to be mounted on a lens device comprising a focus lens moving mechanism for moving a focus lens group and a certain drive section to which operation power is supplied from a camera device, the lens drive system comprising:
    a focus lens driving section that is connected to the focus lens driving mechanism and moves the focus lens group in an optical axis;
    a receiving section that receives an operation signal for remotely operating the focus lens driving section;
    a control section that generates a control signal for controlling the focus lens driving section based on the operation signal; and
    a power section that is charged with at least a part of the operation power supplied to the certain drive section and supplies the charged power to the focus lens driving section, the receiving section, and the control section as operation power.

14. The lens driving system according to claim 13, wherein the lens driving system is detachably mounted on the lens device.

15. The lens driving system according to claim 13, wherein the operation power supplied to the lens driving system is supplied to the power section through the certain drive section.

16. The lens driving system according to claim 13, wherein the certain drive section is an iris driving section or an infrared ray cut-off filter driving section.

17. The lens driving system according to claim 13, wherein the power section that is charged with at least a part of the operation power supplied to the certain drive section includes a rechargeable battery.

18. The lens driving system according to claim 13, wherein the power section that is charged with at least a part of the operation power supplied to the certain drive section includes a super capacitor.

* * * * *